US012165573B2

(12) United States Patent
Zheng et al.

(10) Patent No.: US 12,165,573 B2
(45) Date of Patent: Dec. 10, 2024

(54) DISPLAY PANEL AND SEMICONDUCTOR DISPLAY APPARATUS

(71) Applicant: HUAWEI TECHNOLOGIES CO., LTD., Guangdong (CN)

(72) Inventors: Zhiwei Zheng, Osaka (JP); Yan Zhou, Shenzhen (CN); Yuchao Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/186,295

(22) Filed: Mar. 20, 2023

(65) Prior Publication Data

US 2023/0237961 A1 Jul. 27, 2023

Related U.S. Application Data

(63) Continuation of application No. PCT/CN2021/119100, filed on Sep. 17, 2021.

(30) Foreign Application Priority Data

Sep. 21, 2020 (CN) ......................... 202011012477.3

(51) Int. Cl.
*G09G 3/32* (2016.01)
*G09F 9/33* (2006.01)
*G09G 3/20* (2006.01)

(52) U.S. Cl.
CPC ................. *G09G 3/32* (2013.01); *G09F 9/33* (2013.01); *G09G 3/2088* (2013.01);
(Continued)

(58) Field of Classification Search
CPC .... G09F 9/33; G09G 3/32; G09G 2300/0452; G09G 2330/021; G09G 3/2014;
(Continued)

(56) References Cited

U.S. PATENT DOCUMENTS 10,217,402 B1 2/2019 Vahid Far et al.
10,395,589 B1 * 8/2019 Vahid Far ............ G09G 3/3208
(Continued)

FOREIGN PATENT DOCUMENTS

CN 105027187 A 11/2015
CN 206248923 U 6/2017
(Continued)

OTHER PUBLICATIONS

Extended European Search Report for Application No. 21868724 dated Dec. 5, 2023, 9 pages.
(Continued)

*Primary Examiner* — Nitin Patel
*Assistant Examiner* — Cory A Almeida

(57) ABSTRACT

A display panel (11) with a low signal transmission power and large cabling space, and a semiconductor display apparatus including the display panel (11) are provided. The display panel (11) includes pixel areas (DB) that are of N rows and M columns and that are connected in a matrix, each pixel area (DB) includes pixel drive modules that are of Q rows and P columns and that are connected in a matrix, each pixel drive circuit (PD) is connected to at least one pixel unit (P), and the pixel drive circuit (PD) drives, based on to-be-displayed image data, the pixel unit (P) to emit light to display an image. All pixel areas (DB) in any column of the pixel areas (DB) are connected to data interfaces (DI) in a same group, and pixel areas (DB) in different columns are connected to data interfaces (DI) in different groups.

18 Claims, 9 Drawing Sheets

(52) U.S. Cl.
CPC ... *G09G 3/2014* (2013.01); *G09G 2300/0426* (2013.01); *G09G 2300/0452* (2013.01); *G09G 2310/0275* (2013.01); *G09G 2310/04* (2013.01); *G09G 2330/021* (2013.01)

(58) Field of Classification Search
CPC ......... G09G 3/2077; G09G 2300/0426; G09G 2310/0275; G09G 2310/04; G09G 2310/021
See application file for complete search history.

(56) References Cited

U.S. PATENT DOCUMENTS

| | | | |
|---|---|---|---|
| 10,395,590 | B1 | 8/2019 | Lin et al. |
| 2003/0117347 | A1 | 6/2003 | Hunter et al. |
| 2013/0086441 | A1 | 4/2013 | Yang et al. |
| 2013/0294530 | A1 | 11/2013 | Martin et al. |
| 2014/0267683 | A1* | 9/2014 | Bibl ........................ G09G 3/006 348/87 |
| 2015/0348504 | A1 | 12/2015 | Sakariya et al. |
| 2016/0276326 | A1 | 9/2016 | Natarajan et al. |
| 2018/0240409 | A1 | 8/2018 | Li et al. |
| 2018/0247586 | A1 | 8/2018 | Vahid Far et al. |
| 2019/0206324 | A1 | 7/2019 | Kim et al. |
| 2019/0206330 | A1* | 7/2019 | Kim ..................... G09G 3/3283 |
| 2020/0035749 | A1 | 1/2020 | Chen et al. |
| 2020/0117050 | A1* | 4/2020 | Shao ................. G02F 1/133602 |
| 2020/0344856 | A1* | 10/2020 | Chen .................... G09G 3/3406 |
| 2021/0343231 | A1* | 11/2021 | Gray ...................... H04B 3/542 |

FOREIGN PATENT DOCUMENTS

| | | | |
|---|---|---|---|
| CN | 109273436 | A | 1/2019 |
| CN | 109801568 | A | 5/2019 |
| CN | 110010059 | A | 7/2019 |
| CN | 110083609 | A | 8/2019 |
| CN | 209546039 | U | 10/2019 |
| CN | 111243496 | A | 6/2020 |
| CN | 111477159 | A | 7/2020 |
| DE | 3133742 | C2 | 11/1985 |
| FR | 2834152 | A1 | 6/2003 |
| JP | 2000199885 | A | 7/2000 |
| JP | 2007302877 | A | 11/2007 |
| JP | 5303853 | B2 | 10/2013 |
| TW | 521256 | B | 2/2003 |
| WO | 2020030993 | A1 | 2/2020 |

OTHER PUBLICATIONS

Chinese Office Action for Application No. 2020110124773 dated Oct. 21, 2022, 8 pages.
Chinese Office Action for Application No. 2020110124773 dated Feb. 20, 2023, 6 pages.
Chinese Office Action for Application No. 2020110124773 dated May 11, 2023, 8 pages.
PCT International Search Report for Application No. PCT/CN2021/119100 dated Sep. 17, 2021, 12 pages.

* cited by examiner

DISPLAY PANEL AND SEMICONDUCTOR DISPLAY APPARATUS

CROSS-REFERENCE TO RELATED APPLICATIONS

This application is a continuation of International Application No. PCT/CN2021/119100, filed on Sep. 17, 2021, which claims priority to Chinese Patent Application No. 202011012477.3, filed on Sep. 21, 2020. The disclosures of the aforementioned applications are hereby incorporated by reference in their entireties.

TECHNICAL FIELD

This application relates to the field of display technologies, and in particular, to a display panel and a semiconductor display apparatus that use a micro light emitting diode as a light emitting element.

BACKGROUND

A micro LED (Micro LED or μ-LED) is referred to as a micro light emitting diode. To address and transfer an enormous quantity of traditional LEDs to a circuit substrate after arraying and miniaturization, to form LEDs with an ultra-small spacing, a length of the LED at a millimeter level is further miniaturized to a micrometer level, to achieve ultra-high resolution. The micro LED does not require a backlight source and can automatically emit light. Colors of the micro LED are easily and accurately adjusted. In addition, the micro LED has a long light-emitting life, higher luminance, and a low encapsulation requirement, and is easier to implement flexible and seamless stitching display. Therefore, the micro LED is one of the most promising display types in the future.

Pixel units connected in a matrix are disposed in a display area of a display panel. Each pixel unit includes a plurality of μ-LEDs and at least one integrated pixel drive circuit. The pixel drive circuit is configured to receive image data and control light emitting luminance of the plurality of μ-LEDs based on the image data. Each pixel drive circuit needs to be directly connected to a display driver circuit to receive the image data and a clock signal. Apparently, a large quantity of input/output interfaces (input/output port, I/O) need to be provided for the display driver circuit. Therefore, there are a large quantity of connection cables between the pixel drive circuit and the display driver circuit. Consequently, cabling space of the display panel is crowded, and a long cabling path between the pixel drive circuit and the display driver circuit causes high power consumption of the image data and the clock signal.

SUMMARY

To resolve the foregoing technical problem, embodiments of this application provide a display panel with a low signal transmission power and large cabling space, and a semiconductor display apparatus including the foregoing display panel.

According to a first aspect, in an implementation of this application, a display panel is provided, including pixel areas that are of N rows and M columns and that are connected in a matrix, where each pixel area includes pixel drive modules that are of Q rows and P columns and that are connected in a matrix, each pixel drive circuit is connected to at least one pixel unit, the pixel drive circuit drives, based on to-be-displayed image data, the pixel unit to emit light to display an image, and N, M, Q, and P are natural numbers greater than 1. All pixel areas in any column of the pixel areas are connected to data interfaces in a same group, and pixel areas in different columns are connected to data interfaces in different groups. In any one of the pixel areas, a plurality of pixel drive circuits in any column of pixel drive circuits are sequentially cascaded to form Q levels of cascaded pixel drive circuits, a first-level pixel drive circuit is connected to one data interface to receive the image data, and the image data is transmitted to a $Q^{th}$-level pixel drive circuit in a cascading sequence.

Pixel drive circuits in a display area are grouped into a plurality of pixel areas, and pixel drive circuits in each pixel area are connected in a cascading manner and transmit image data. Each pixel area individually receives image data, thereby effectively reducing transmission power consumption during transmission of the image data. In addition, the pixel drive circuits in each pixel area are sequentially cascaded, thereby effectively reducing a quantity of cables and a quantity of interfaces for transmission of the image data and transmission power consumption for the image data, and ensuring transmission accuracy of the image data.

Further, when the display area needs to perform image display only in a part of the area, the image data needs to be loaded only in some of the pixel areas on which image display is performed, and an area on which image display does not need to be performed may be in a black screen state without loading data, that is, image display is performed on the part of the display area. Therefore, data transmission power consumption can be further reduced.

In an embodiment, display driver modules of at least two different pixel areas are connected to different clock interfaces, the clock interface includes a data clock interface for providing a data clock signal, and the data clock signal is used to control a time sequence of loading the image data to the plurality of pixel drive circuits in any column of the pixel drive circuits. The first-level pixel drive circuit is connected to one data clock interface to receive the data clock signal, and the data clock signal is transmitted to the $Q^{th}$-level pixel drive circuit in the cascading sequence.

pixel drive circuits in the display area are grouped into a plurality of pixel areas, and pixel drive circuits in each pixel area are connected in a cascading manner and transmit image data. Each pixel area individually receives a clock signal, thereby effectively reducing transmission power consumption during transmission of the clock signal.

In an embodiment, the data clock signal includes Q consecutive pulse signals, one-bit image data is loaded to a one-level pixel drive circuit for each pulse signal, and the image data is separately loaded to the Q levels of the pixel drive circuits based on the Q consecutive pulse signals. Each pulse signal in the data clock corresponds to the one-level pixel drive circuit, so that the image data is accurately loaded to the corresponding pixel drive circuit and pixel unit based on the data clock.

In an embodiment, the clock interface further includes a global data clock interface, and the global data clock signal is used to control light emitting duration of each pixel unit in a time length of one frame of the image; and the first-level pixel drive circuit is connected to one global clock interface to receive a global clock signal, and the global clock signal is transmitted to the $Q^{th}$-level pixel drive circuit in the cascading sequence. The global clock signal cooperates with the data clock signal to accurately control duration for which the pixel drive circuit drives the pixel unit to emit light, so that the pixel unit accurately emits light based on the image data to display the image.

In an embodiment, each pixel unit includes three light emitting elements, each light emitting element emits light of different colors, the light emitting element is a micro light emitting diode, an anode of the micro light emitting diode is connected to a drive power supply, a cathode of the micro light emitting diode is connected to the pixel drive circuit, and the drive power supply is configured to provide a drive current for the light emitting element; and the pixel drive circuit controls, based on the image data, a time length for providing the drive current to each of the light emitting elements, where light emitting luminance of each of the light emitting elements is positively correlated with the time length.

In an embodiment, each pixel drive circuit is connected to the four pixel units, the pixel drive circuit includes one input interface and four groups of output interfaces, the input interface is connected to the one data interface, and one group of the output interfaces is connected to cathodes of the three light emitting elements in one pixel. The pixel drive circuit drives the four pixel units, so that a drive capability of the pixel drive circuit matches a pixel unit used as a load, thereby ensuring accurate display of the image data.

In an embodiment, the pixel drive circuit is a micro integrated circuit.

In an embodiment, the display panel includes a display area and a non-display area, and the pixel areas that are of N rows and M columns and that are connected in a matrix are disposed in the display area. The display panel further includes a display driver circuit disposed in the non-display area, where the display driver circuit is connected to pixel drive circuits in the plurality of pixel areas, and is configured to output the image data, the data clock signal, and the global clock signal to the pixel drive circuit. The image data and the clock signal that are output by the display driver circuit cooperate with each other and are accurately recorded in a pixel by using the pixel drive circuit for image display. Because the display driver circuit is connected to partitioned pixel drive circuits, a quantity of signal input/output interfaces and a quantity of cables are effectively reduced, thereby simplifying a design and cabling space of the display driver circuit, and also reducing transmission power consumption for the image data and the clock signal.

In an embodiment, if different display driver modules of each pixel area are connected to different clock interfaces, the display driver circuit includes P×M data interfaces, M×N data clock interfaces, and M×N global clock interfaces.

According to a second aspect, in an embodiment of this application, a semiconductor display apparatus is provided, where the semiconductor display apparatus includes the foregoing display panel.

DESCRIPTION OF EMBODIMENTS

Specific embodiments are used below to describe this application.

Figure 1:
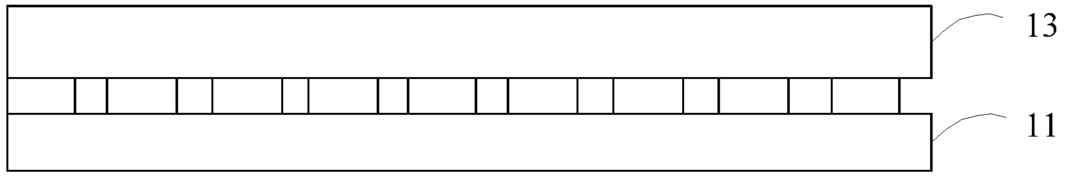
FIG. 1 is a schematic diagram of a structure of a side surface of a display terminal according to this application.

FIG. 1 is a schematic diagram of a structure of a side surface of a display terminal according to this application. As shown in FIG. 1, an electronic terminal 10 includes a protective layer 13 and a bearing panel 11 that are disposed in a stacked manner. The bearing panel 11 includes an array substrate 111 and a plurality of light emitting elements **11*a* that are connected in a matrix and disposed on a surface of the array substrate 111 and that are configured to emit light to display an image. The light emitting elements 11*a* are sandwiched between the protective layer 13 and the array substrate 111. The protective layer 13 is configured to protect the light emitting element 11*a*, to prevent the light emitting element 11*a*** from being damaged.

In this embodiment, the light emitting element **11*a* is a micro light emitting diode (Micro LED or μ-LED), and a size range of the light emitting element 11*a* is from 1 μm to 100 μm. Because the micro light emitting diode is a light emitting element made of a semiconductor material, the electronic terminal 10** including the micro light emitting diode may alternatively be referred to as a semiconductor display apparatus.

In this embodiment, when the electronic terminal 10 is a display terminal, the bearing panel 11 is a display panel, and the light emitting element **11*a* disposed on the array substrate 111 is used as a pixel element for image display, and is configured to perform image display. In another embodiment of this application, the electronic terminal 10 may alternatively be a light source, and the array substrate 111** may be a support structure, for example, a circuit board.

In this embodiment, the electronic terminal 10 may be a terminal device, for example, a wearable device such as a watch, a mobile phone, or a display.

In this embodiment, an example in which the bearing panel 11 is the display panel is used to specifically describe a panel layer structure and a specific process of the display panel.

Figure 2:
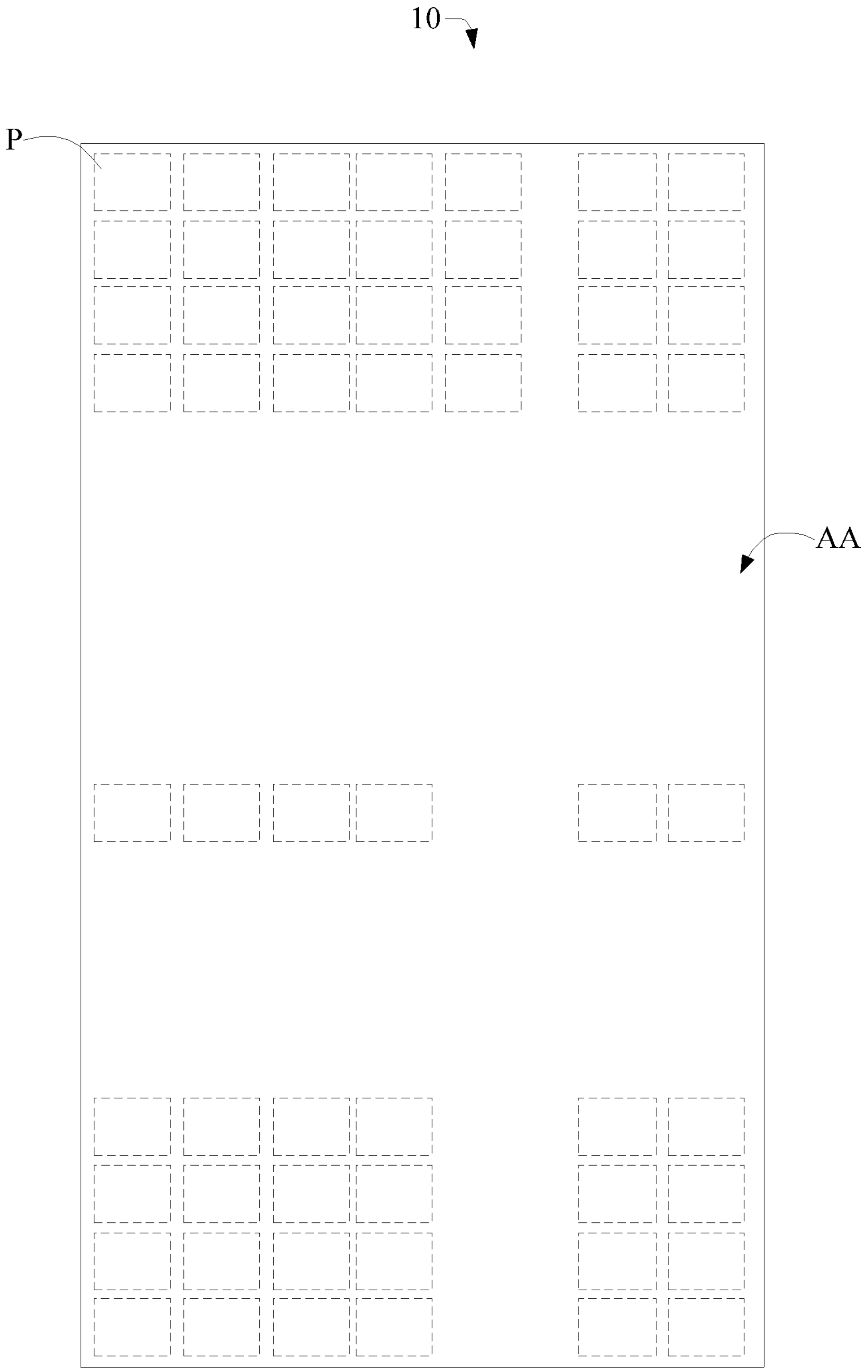
FIG. 2 is a schematic diagram of a planar structure of a bearing panel shown in FIG. 1.
Figure 3:
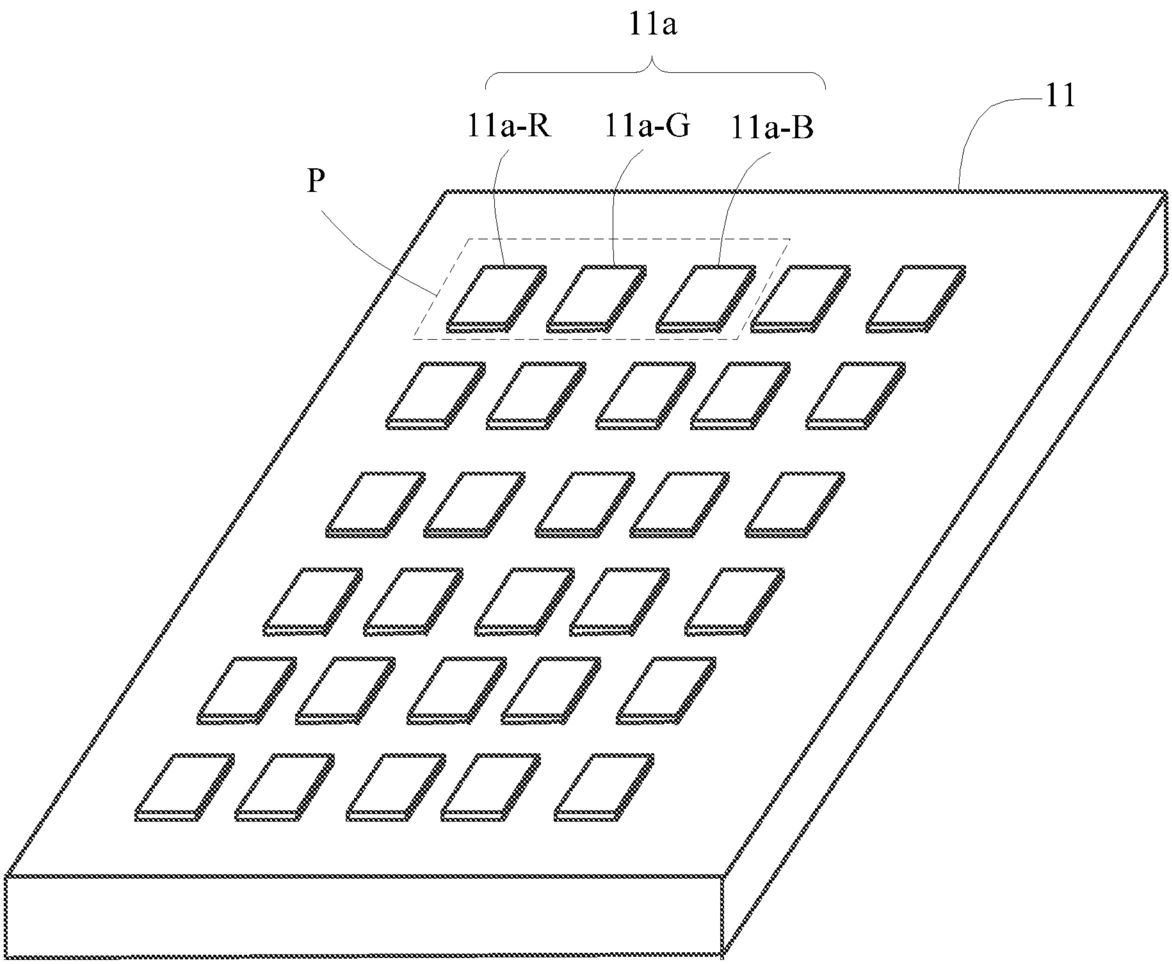
FIG. 3 is a schematic diagram of a three-dimensional structure of a pixel unit in a display panel shown in FIG. 2.

Refer to FIG. 2 and FIG. 3. FIG. 2 is a schematic diagram of a planar structure of the bearing panel 11 shown in FIG. 1. As shown in FIG. 2, a display area AA (Active Area) of the display panel 11 includes a plurality of pixel units P that are arrayed and evenly arranged, and each pixel unit P includes a plurality of light emitting elements **11*a* disposed at intervals of a preset distance. The pixel unit P includes a plurality of light emitting elements 11*a* that emit light of different colors. Another function module for driving a pixel unit to perform image display is disposed in a non-display area NA (Not active Area) (refer to FIG. 4**) of the display panel. In this embodiment, the non-display area NA does not perform image display, and the another function module for driving the pixel unit to perform image display may be a functional circuit, for example, a display driver circuit or a power supply circuit.

FIG. 3 is a schematic diagram of a three-dimensional structure of a pixel unit in the display panel 11 shown in FIG. 2. As shown in FIG. 3, the pixel unit P includes a light emitting element 11*a*-R for emitting red light, a light emitting element 11*a*-G for emitting green light, and a light emitting element 11*a*-B for emitting blue light. Gray-scale luminance of the light of different colors emitted by the light emitting elements 11*a* is controlled, so that the pixel unit P can emit color light of different colors, and the display panel 11 can display a color image. In this embodiment, red is defined as a first color, green is defined as a second color, and blue is defined as a third color.

In another embodiment of this application, the pixel unit P may further include light emitting elements that emit light of four colors: red light, green light, blue light, and white light. In this case, a first color may be one of the four colors: red, green, blue, and white, a second color may be one of the four colors: red, green, blue, and white, and a third color may be one of the four colors: red, green, blue, and white. In a same pixel unit P, the first color, the second color, and the third color are different from each other. For example, the first color is green, the second color is blue, and the third color is red. Alternatively, the first color is blue, the second color is red, and the third color is green. Alternatively, the first color is white, the second color is blue, and the third color is red. Alternatively, the first color is green, the second color is white, and the third color is red. Alternatively, the first color is green, the second color is blue, and the third color is white.

Figure 4:
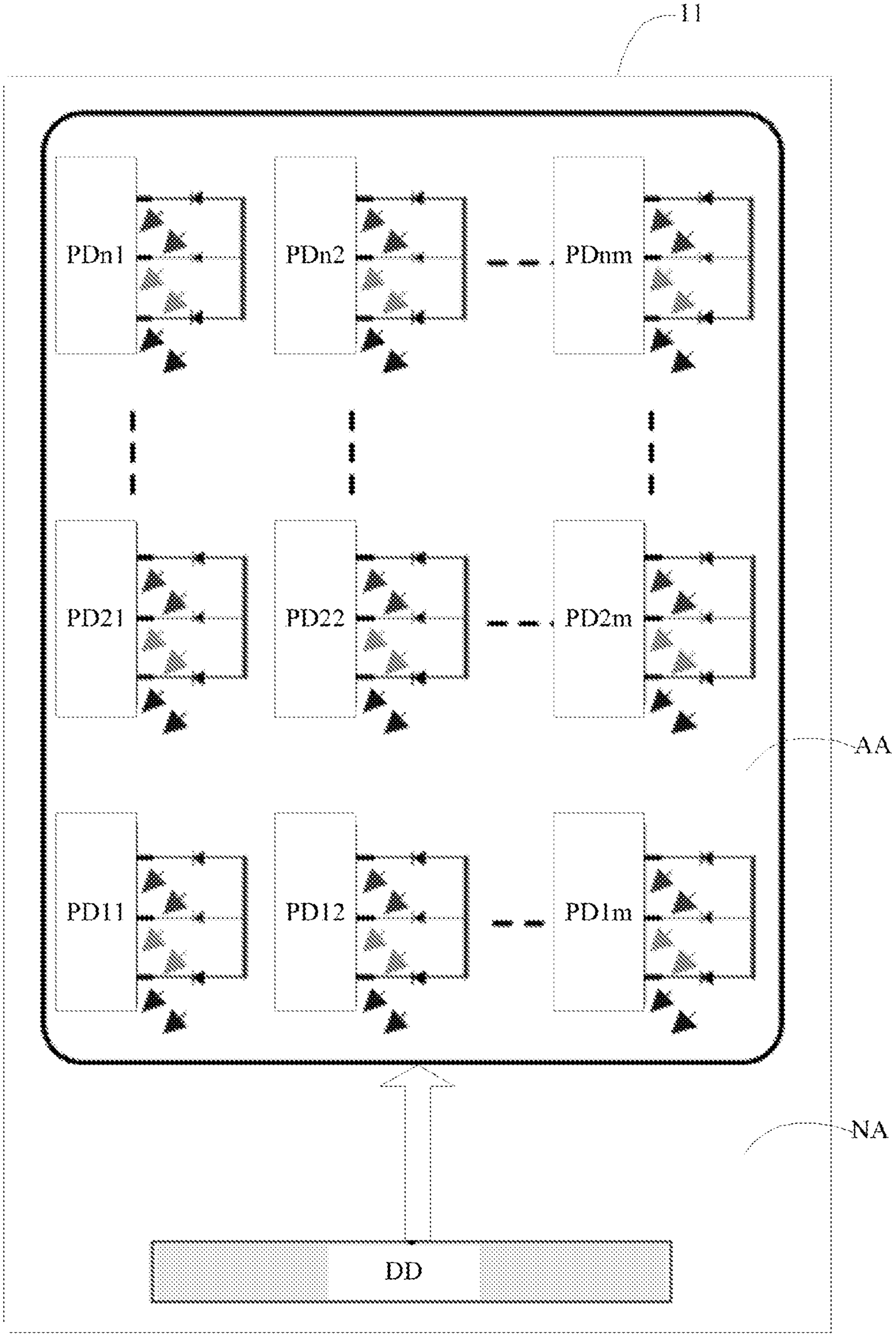
FIG. 4 is a schematic diagram of a structure of a drive circuit of the pixel unit in the display panel shown in FIG. 3.

FIG. 4 is a schematic diagram of a structure of a drive circuit of the pixel unit in the display panel shown in FIG. 3.

As shown in FIG. 4, a display area AA includes a plurality of pixel units P arranged in an array and a plurality of pixel drive circuits PD arranged in an array. One pixel drive circuit PD is connected to at least one pixel unit P. In other words, one pixel drive circuit PD is connected to K pixel units, where K is a natural number greater than or equal to 1. In this embodiment, the display area AA includes n×m pixel drive circuits PD arranged in a matrix, where n and m are natural numbers greater than 1.

In this embodiment, the plurality of pixel drive circuits PD arranged in the display area AA may be shown in FIG. 4: pixel drive circuits PD in a first row: PD11, PD12, . . . , and PD1*m*; pixel drive circuits PD in a second row: PD21, PD22, . . . , and PD2*m*; and pixel drive circuits PD in an $n^{th}$ row: PDn1, PDn2, . . . , and PDnm.

The pixel drive circuit PD is further connected to a display driver circuit DD. The display driver circuit DD is configured to receive to-be-displayed image data Data and a clock signal CK from a time sequence control circuit. In this embodiment, the image data received by the display driver circuit DD is a signal in a digital form. The clock signal CK is a pulse signal with preset pulse width (duty cycle). In this embodiment, the clock signal CK includes a data clock signal CLK and a global clock signal GCLK (GK), the clock signal includes a data clock signal SCLK (SK) used to control data loading, and the SCLK (SK) is a time sequence of the pixel drive circuit PD.

The global clock signal GCLK is used to control a time length for the pixel drive circuit PD loading the image data to the pixel unit, that is, used to control a time length for each pixel unit emitting, in a display cycle of one frame of an image, light to display the image data. In this embodiment, the global clock signal GCLK is a time control clock for light emitting of the light emitting element, and a clock frequency of the global clock signal GCLK is related to a bit (bit) quantity and a frame rate of a pixel unit. When a gray scale of the pixel unit is represented by using 12 binary numbers, the global clock signal GCLK may be represented as: $2^{12}\times60$ $2^{12}\times60$ Hz.

The pixel drive circuit PD receives the image data based on the clock signal, and when the image data is a signal in a digital form, converts the image data into a drive data current of an analog signal, and transmits and loads the drive data current to each light emitting element in the pixel unit P, to control the light emitting element to emit light with corresponding luminance based on the image data and perform corresponding image display. Specifically, the pixel drive circuit PD controls, based on the image data, a time length for providing the drive current to each light emitting element, and light emitting luminance of each light emitting element is positively correlated with the time length, that is, gray-scale luminance represented in binary is used for the image data. Higher gray-scale luminance leads to a longer time length for the pixel drive circuit PD controlling the drive current to be provided to each light emitting element, and correspondingly, higher luminance of the pixel unit. Lower gray-scale luminance leads to a shorter time length for the pixel drive circuit PD controlling the drive current to be provided to each light emitting element, and correspondingly, lower luminance of the pixel unit.

In this embodiment, the pixel drive circuit PD controls, through pulse width modulation (PWM), the time length for providing the drive current to each light emitting element. That is, higher gray-scale luminance leads to a larger duty cycle (duty) of a PWM signal that is output by the pixel drive circuit PD, and a longer time length for providing the drive current to each light emitting element. Lower gray-scale luminance leads to a smaller duty cycle of a PWM signal that is output by the pixel drive circuit PD, and correspondingly, a shorter time length for controlling the drive current to be provided to each light emitting element.

In this embodiment, the display driver circuit DD may be a display driver integrated circuit (DDIC) in an integrated circuit form, that is, the display driver circuit DD can simultaneously output image data, a data clock signal, a global clock signal, a frame synchronization signal, a row synchronization signal, and the like.

Figure 5:
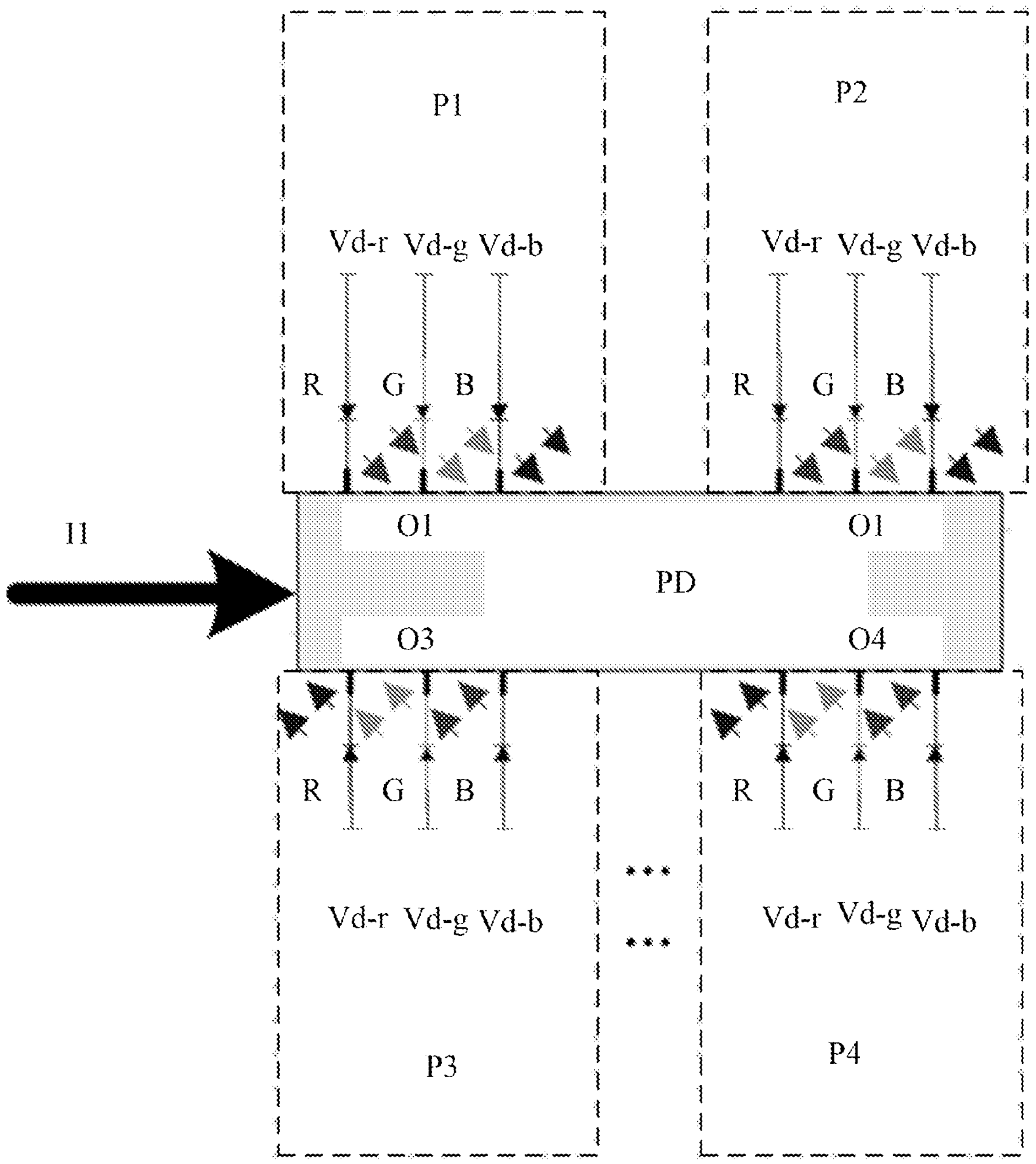
FIG. 5 is a schematic diagram of a structure of a specific connection between a pixel drive circuit shown in FIG. 4 and a pixel unit.

More specifically, FIG. 5 is a schematic diagram of a structure of a specific connection between a pixel drive circuit PD shown in FIG. 4 and a pixel unit P.

In this embodiment, one pixel drive circuit PD is connected to four pixel units. In other words, K is 4. The four pixel units are respectively represented as P1 to P4.

Each pixel unit P includes three light emitting elements, and the three light emitting elements are respectively a light emitting element 11*a*-R (R) for emitting red light, a light emitting element 11*a*-G (G) for emitting green light, and a light emitting element 11*a*-B (B) for emitting blue light. The three light emitting elements 11*a*-R, 11*a*-G, 11*a*-B are all micro light emitting diodes μ-LED, an anode of each light emitting element used as a micro light emitting diode μ-LED is connected to a drive power supply Vd, and a cathode is connected to the pixel drive circuit PD. In this embodiment, an anode of the light emitting element 11*a*-R is connected to a drive power supply Vd-r, an anode of the light emitting element 11$a$-G is connected to a drive power supply Vd-g, and an anode of the light emitting element 11$a$-B is connected to a drive power supply Vd-b.

In this embodiment, the pixel drive circuit PD includes a group of input interfaces I1 and four groups of output interfaces O corresponding to the four pixel units. In this embodiment, as shown in FIG. 5, the four groups of output interfaces O are respectively marked as O1 to O4. The input interface I1 is connected to the display driver circuit DD, and is configured to receive to-be-displayed image data and a clock signal from the display driver circuit DD. Each group of output interfaces O1 is connected to one pixel unit P, and each group of output interfaces O1 includes a plurality of interface ends. Each interface end is connected to one light emitting element. As shown in FIG. 5, the output interface O1 is connected to a pixel unit P1, the output interface O2 is connected to a pixel unit P2, the output interface O3 is connected to a pixel unit P3, and the output interface O4 is connected to a pixel unit P4.

A quantity of interface ends in each group of output interfaces O1 is the same as a quantity of light emitting elements in the pixel unit P. In this embodiment, each group of output interfaces O1 includes three interface ends, and each interface end is correspondingly connected to the cathode of the light emitting element.

The pixel drive circuit PD receives the image data based on the clock signal, and when the image data is a signal in a digital form, converts the image data into a drive data current of an analog signal, and transmits and loads the drive data current to each light emitting element in the pixel unit P, to control the light emitting element to emit light with corresponding luminance based on the image data and perform corresponding image display.

Figure 6:
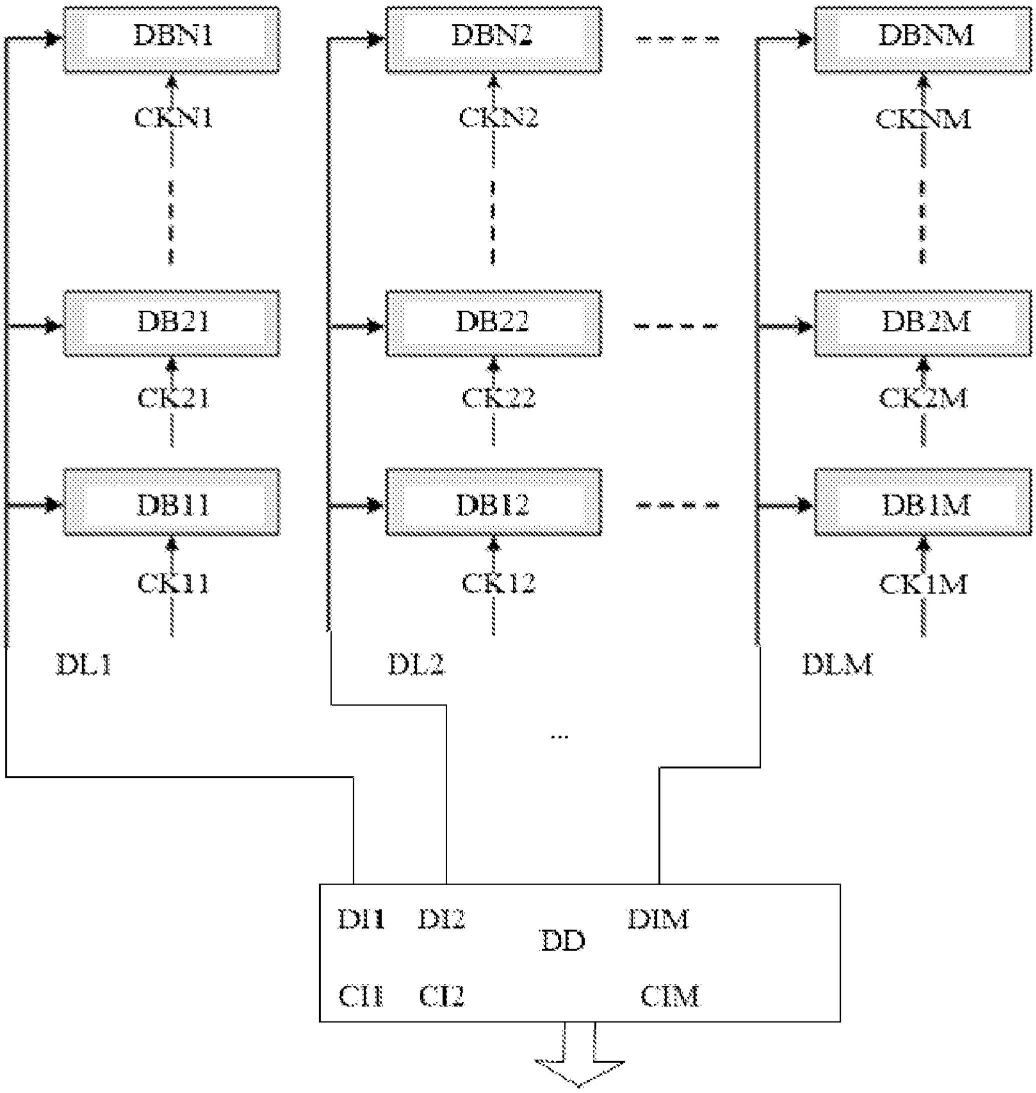
FIG. 6 is a schematic diagram of partitioning of pixel drive circuits shown in FIG. 4.

FIG. 6 is a schematic diagram of partitioning of pixel drive circuits shown in FIG. 4.

As shown in FIG. 6, a display area AA includes pixel areas DB (display pixel block) that are of N rows and M columns and that are connected in a matrix, and both M and N are natural numbers greater than 1. Each pixel area DB includes a plurality of pixel drive circuits PD. Pixel areas DB in any column of display areas are all connected to data interfaces in a same group in a display driver circuit DD, and pixel areas DB in different columns are connected to data interfaces in different groups. In addition, pixel areas DB respectively receive different clock signals.

Specifically, the display driver circuit DD includes M groups of data interfaces DI (data interface), and pixel drive circuits PD in a same column of pixel areas DB are connected to one group of data interfaces DI by using one group of data lines DL (Data Line). In this embodiment, the M groups of data interfaces DI are respectively marked as DI1 to DIM, and the M groups of data lines DL are respectively marked as DL1 to DLM.

In a first row and the M columns in the display area, there are a pixel area DB11, a pixel area DB12, . . . , and a pixel area DB1M;

- in a second row and the M columns in the display area, there are a pixel area DB21, a pixel area DB22, and a pixel area DB2M; . . . ; and
- in an $N^{th}$ row and the M columns in the display area, there are a pixel area DBN1, a pixel area DBN2, and a pixel area DBNM.

In a first column of the display area, the pixel area DB11, the pixel area DB21, . . . , and the pixel area DBN1 are connected to the first group of data interfaces DI1 by using the first group of data lines DL1;

- in a second column of the display area, the pixel area DB12, the pixel area DB22, . . . , and the pixel area DBN2 are connected to the second group of data interfaces DI2 by using the second group of data lines DL2; . . . ; and
- in an $M^{th}$ column of the display area, the pixel area DBIM, the pixel area DB2M, . . . and the pixel area DBNM are connected to the $M^{th}$ group of data interfaces DIM by using the $M^{th}$ group of data lines DLM.

In this embodiment, pixel drive circuits PD in a same row of pixel areas DB simultaneously receive and load the image data, and different rows of pixel areas DB receive image data in different time periods. After receiving the image data, the pixel drive circuits PD in the same row of pixel areas DB drive, based on the image data, a corresponding light emitting element to perform image display. In addition, in this embodiment, each pixel area DB individually receives a group of clock signals, that is, different pixel units DB separately receive different groups of clock signals CK. The clock signals include a data clock signal SCLK (FIG. 7) and a global clock signal GLCK (FIG. 7).

In this embodiment, the display driver circuit DD respectively outputs N×M groups of clock signals CK by using N×M groups of clock interfaces CI. The N×M groups of clock interfaces CI are respectively marked as CI11, CI12, . . . , and CI1M; CI21, CI22, . . . , and CI2M; and CIN1, CIN2, . . . , and CINM. The N×M groups of clock signals CK are respectively marked as CK11, CK12, . . . , and CK1M; CK21, CK22, . . . , and CK2M; and CKN1, CKN2, . . . , and CKNM. The N×M groups of clock signals CK are respectively and correspondingly provided to the pixel areas DB11, DB12, . . . , and DB1M; DB21, DB22, . . . , and DB2M; and DBN1, DBN2, . . . , and DBNM through the clock interfaces CI11, CI12, . . . , and CI1M; CI21, CI22, . . . , and CI2M; and CIN1, CIN2, . . . , and CINM in sequence.

Figure 7:
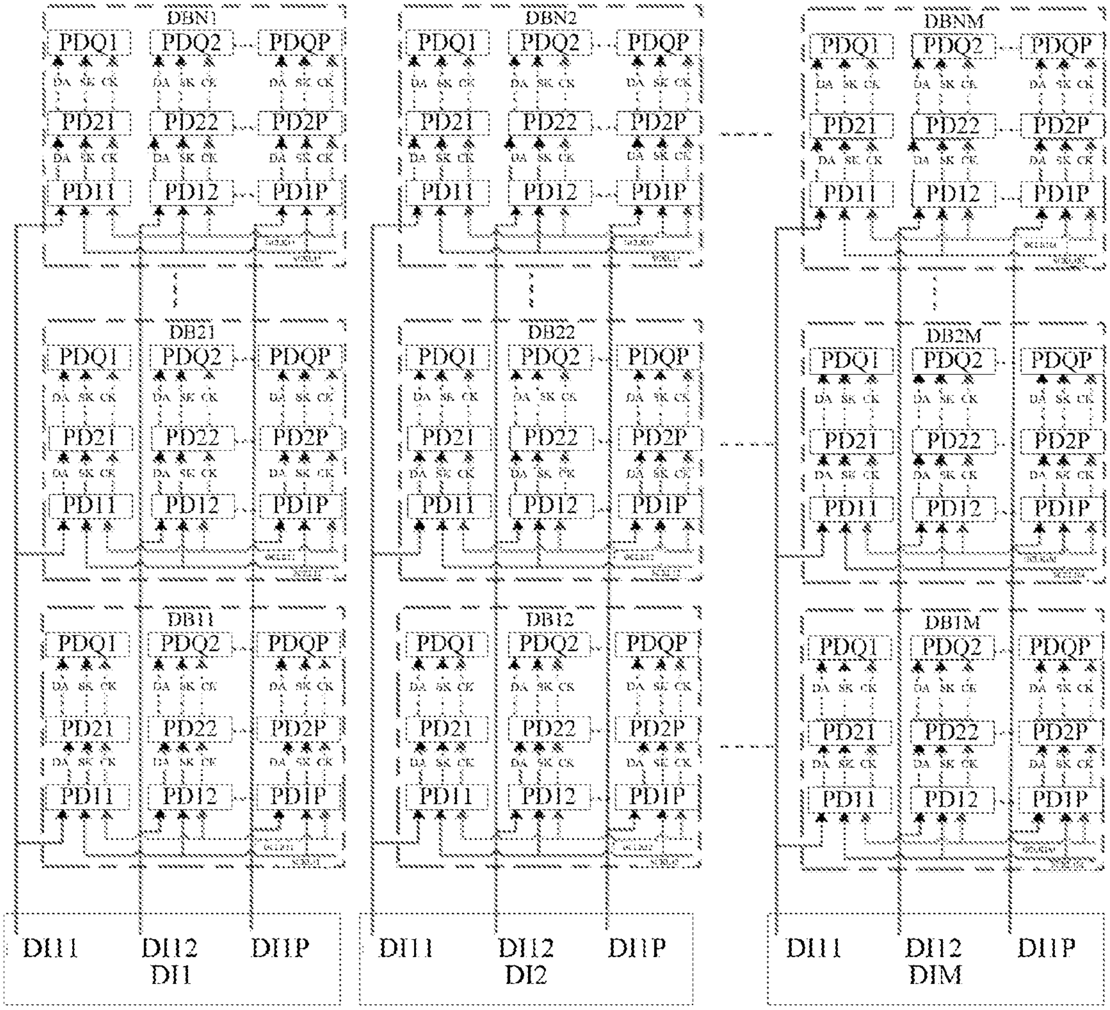
FIG. 7 is a schematic diagram of circuit structures of pixel drive circuits in a plurality of display areas shown in FIG. 6.
Figure 8:
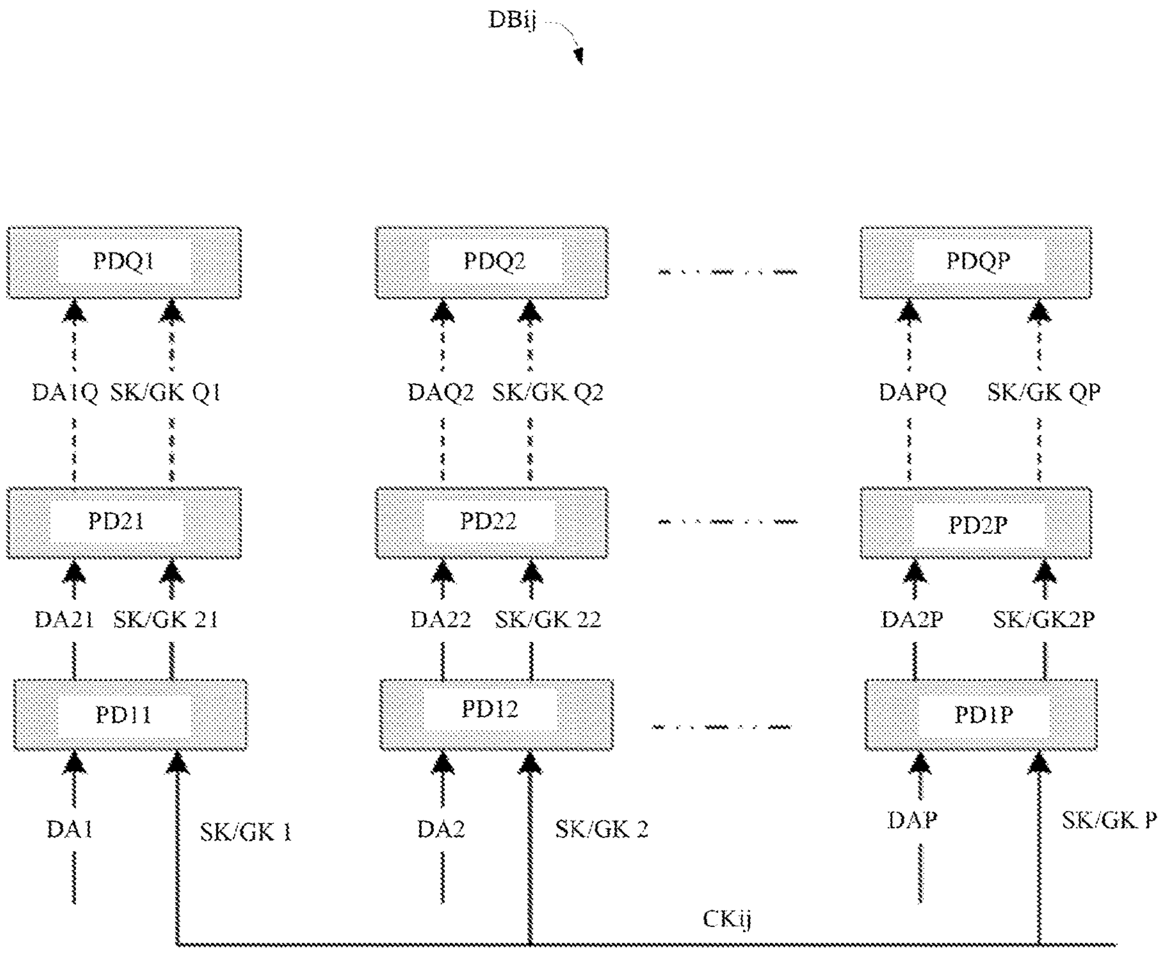
FIG. 8 is a schematic diagram of a circuit structure of a pixel drive circuit in each display area shown in FIG. 7.

Refer to FIG. 7 and FIG. 8 together. FIG. 7 is a schematic diagram of circuit structures of pixel drive circuits in a plurality of display areas shown in FIG. 6, and FIG. 8 is a schematic diagram of a circuit structure of a pixel drive circuit in each display area shown in FIG. 7.

As shown in FIG. 7, in each display area including the pixels areas DB that are of N rows and M columns and that are connected in a matrix, each pixel area DB includes pixel drive circuits PD that are of Q rows and P columns and that are connected in a matrix, and Q and P are separately natural numbers greater than 1.

Specifically, as shown in FIG. 8, in a first row and the P columns of the pixel drive circuits, there are a pixel drive circuit PD11, a pixel drive circuit PD12, . . . , and a pixel drive circuit PD1P;

- in a second row and the P columns of the pixel drive circuits, there are a pixel drive circuit PD21, a pixel drive circuit PD22, and a pixel drive circuit PD2P; . . . ; and
- in a $Q^{th}$ row and the P columns of the pixel drive circuits, there are a pixel drive circuit PDN1, a pixel drive circuit PDN2, and a pixel drive circuit PDQP.

In this embodiment, pixel drive circuits PD in a same column are sequentially cascaded to form a first-level pixel drive circuit to a $Q^{th}$-level pixel drive circuit. An input interface I1 of the first-level pixel drive circuit PD is connected to one group of data interfaces and clock interfaces of the display driver circuit DD, and is configured to receive to-be-displayed image data and a clock signal. An input interface I1 of a second-level pixel drive circuit PD is connected to an output interface O1 of the first-level pixel drive circuit PD. An input interface I1 of a third-level pixel drive circuit PD is connected to an output interface O1 of the second-level pixel drive circuit PD. By analogy, an input interface I1 of the $Q^{th}$-level pixel drive circuit PD is connected to an output interface O1 of a $(Q-1)^{th}$-level pixel drive circuit PD.

For example, as shown in FIG. 8, a pixel area DBij in an $i^{th}$ row and a $j^{th}$ column is used as an example. In the pixel area DBij, for pixel drive circuits PD in the first column, a pixel drive circuit PD11 to a pixel drive circuit PDQ1 are sequentially cascaded to form Q levels of the cascaded pixel drive circuits.

As shown in FIG. 8, a pixel drive circuit PD11 is used as a first-level pixel drive circuit, a pixel drive circuit PD21 is used as a second-level pixel drive circuit, a pixel drive circuit PD31 is used as a third-level pixel drive circuit, and a pixel drive circuit PDQ1 is used as a $Q^{th}$-level pixel drive circuit.

An input interface I1 of the pixel drive circuit PD11 used as the first-level pixel drive circuit is connected to one group of data interfaces DIi1 and one group of clock interfaces CIi1 of the display driver circuit DD, and is configured to receive to-be-displayed image data DA1 and a clock signal SK/CK1.

An input interface I1 of the pixel drive circuit PD21 used as the second-level pixel drive circuit is connected to an output interfaces O1 of the pixel drive circuit PD11, and receives image data DA21 and a clock signal SK/CK21 from the pixel drive circuit PD11.

An input interface I1 of the pixel drive circuit PD31 (not shown in the figure) used as the third-level pixel drive circuit is connected to an output interface O1 of the pixel drive circuit PD21, and receives image data (not shown in the figure) and a clock signal (not shown in the figure) from the pixel drive circuit PD21.

By analogy, an input interface I1 of the pixel drive circuit PDQ1 used as the $Q^{th}$-level pixel drive circuit is connected to an output interface O1 of the pixel drive circuit PDQ-11, and receives image data DA Q1 and a clock signal SK/CKQ1 from the pixel drive circuit PDQ-11.

Certainly, for the pixel drive circuits PD in the second to $P^{th}$ column, a cascading manner of and image data and clock signals received by the pixel drive circuits are the same as a cascading manner of and image data and clock signals received by the pixel drive circuits PD in the first column. Details are not described in this embodiment again.

It should be noted that, for pixel drive circuits in any pixel area DB, pixel drive circuits PD in different columns simultaneously start to receive image data and clock signals, and pixel drive circuits PD in a same column sequentially receive image data and clock signals in a cascading sequence.

In this embodiment, for a plurality of pixel drive circuits PD connected in a matrix and a plurality of display driver circuits DD connected in a matrix in the display area AA and for image data, one data interface 1 is required for each column of pixel drive circuits. Each pixel area DB includes P columns of pixel drive circuits PD. Therefore, for M columns in the display area, the display driver circuit DD includes at least P×M data interfaces. P×M is a quantity m of columns of the pixel drive circuits PD, that is, P×M=m.

For a clock signal, each pixel area DB includes one independent data clock signal SCLK and one independent global clock signal GCLK. Therefore, for an N×M display area, the display driver circuit DD includes 2×N×M clock interfaces.

Therefore, in this embodiment, the display driver circuit DD include P×M+2×N×M data interfaces and clock interfaces. If both the data interface and the clock interface are defined as input/output interfaces I/O, in this case, the display driver circuit DD requires P×M+2×N×M input/output interfaces I/O.

However, in a conventional technical solution, the display driver circuit DD requires 3 m data interfaces and clock interfaces. However, in the technical solution of the present invention, the display driver circuit DD include m+2×N×M data interfaces and clock interfaces, and M and N are both data less than m. Therefore, the input/output interfaces I/O required by the display driver circuit DD are effectively reduced, so that complexity of cabling between the plurality of pixel drive circuits PD connected in a matrix and the plurality of display driver circuits DD connected in a matrix in the display area AA can be effectively reduced, thereby increasing cabling space.

Figure 9:
FIG. 9 is a time sequence diagram of receiving image data by a pixel drive circuit in a display area shown in FIG. 8.

FIG. 9 is a time sequence diagram of receiving image data by a pixel drive circuit in the display area shown in FIG. 8. A process of receiving image data by a pixel drive circuit in one display area is specifically described with reference to FIG. 8 and FIG. 9.

Symbols in FIG. 9 are represented and described as follows: Data is image data that needs to be received by pixel drive circuits in a same column in one display area; and CLK is a data clock signal for controlling pixel drive circuits at different levels in a same column of pixel drive circuits in one display area to receive image data in a time-sharing manner.

Data includes image data of Q bits (bit), and image data of one bit (bit) is image data correspondingly loaded to one pixel drive circuit. Correspondingly, the CLK includes clock pulses in Q cycles, and for a clock pulse in one cycle, image data of one bit (bit) is loaded to a corresponding pixel drive circuit PD.

Specifically, in a clock pulse in a first cycle of the data clock signal CLK, image data of a first bit (bit) in the image data Data is loaded to a first-level pixel drive circuit PD1*j*;

in a clock pulse in a second cycle of the data clock signal CLK, image data of a second bit (bit) in the image data Data is loaded to a second-level pixel drive circuit PD2*j*;

in a clock pulse in a third cycle of the data clock signal CLK, image data of a third bit (bit) in the image data Data is loaded to a third-level pixel drive circuit PD3*j*;

. . . ;

and by analogy, in a clock pulse in a $Q^{th}$ cycle of the data clock signal CLK, image data of a $Q^{th}$ bit (bit) in the image data Data is loaded to a $Q^{th}$-level pixel drive circuit PDQj.

With reference to FIG. 5 to FIG. 9, an operating time sequence of a display driver circuit in each pixel area DB in the display area AA is specifically described.

The display driver circuit DD loads the image data to display areas in an $N^{th}$ row based on a time sequence synchronization system Vk1. That is, a pixel area DBN1 to a pixel area DBNM in the $N^{th}$ row simultaneously receive the image data Data, and in each display area in the $N^{th}$ row, the image data is sequentially loaded to the first-level pixel drive circuit PD1*j* to the $Q^{th}$-level pixel drive circuit PDQj based on the data clock signal CLK.

When loading the image data to levels of pixel drive circuits PD in the pixel area DBN1 to the pixel area DBNM in the $N^{th}$ row is completed, the light emitting element is further controlled, under control of the global clock signal based on the image data, to emit light, to perform image display.

The display driver circuit DD further loads the image data to display areas in an $(N-1)^{th}$ row based on the time sequence synchronization system Vk1. That is, a pixel area DB(N−1) to a pixel area DB(N−1)M in the $(N-1)^{th}$ row simultaneously receive the image data Data, and in each display area in the $(N-1)^{th}$ row, the image data is sequentially loaded to the first-level pixel drive circuit PD1*j* to the $Q^{th}$-level pixel drive circuit PDQj based on the data clock signal CLK.

When loading the image data to levels of pixel drive circuits PD in the pixel area DB(N−1)1 to the pixel area DB(N−1)M in the $(N-1)^{th}$ row is completed, the light emitting element is further controlled, under control of the global clock signal based on the image data, to emit light, to perform image display.

By analogy, the display driver circuit DD finally loads the image data to display areas in a first row based on the time sequence synchronization system Vk1. That is, a pixel area DB11 to a pixel area DBIM in the first row simultaneously receive the image data Data, and in each display area in the first row, the image data is sequentially loaded to the first-level pixel drive circuit PD1*j* to the Qth-level pixel drive circuit PDQj based on the data clock signal CLK.

When loading the image data to levels of pixel drive circuits PD in the pixel area DB11 to the pixel area DBIM in a first row is completed, the light emitting element is further controlled, under control of the global clock signal based on the image data, to emit light, to perform image display.

In this embodiment, the pixel drive circuits PD in the display area AA are grouped into a plurality of pixel areas DB, and pixel drive circuits PD in each pixel area DB are connected in a cascading manner and transmit the image data. Each pixel area DB individually receives a clock signal, thereby effectively reducing transmission power consumption during transmission of the clock signal.

In addition, when the display area AA needs to perform image display only in a part of the area, the image data needs to be loaded only in some of the pixel areas DB on which image display is performed, and an area on which image display does not need to be performed may be in a black screen state without loading data, that is, image display is performed on the part of the display area AA. Therefore, data transmission power consumption can be further reduced.

For example, when the electronic terminal 10 is in a standby state or a low power consumption state, an image does not need to be displayed in full screen, but needs to be displayed only in a preset part of the display area AA. In this case, the image data needs to be loaded to only a pixel area DB in the preset part of the display area AA, and does not need to be loaded to a pixel area DB other than the preset part of the display area AA. It can be seen that, because the image data does not need to be loaded to the pixel area DB other than the preset part of the display area AA, power consumption of transmitting the image data to the part of the area may be effectively reduced.

Figure 10:
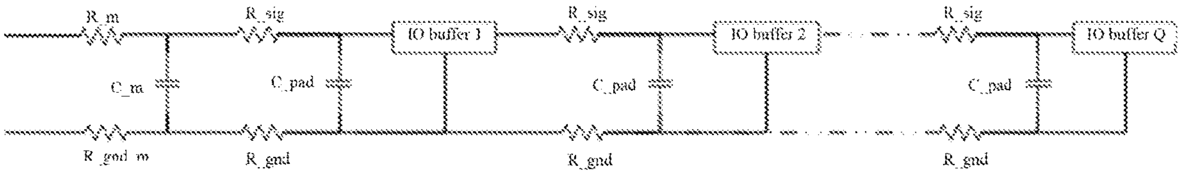
FIG. 10 is an equivalent circuit diagram of transmitting image data to a pixel drive circuit in one pixel area shown in FIG. 7.
Figure 11:
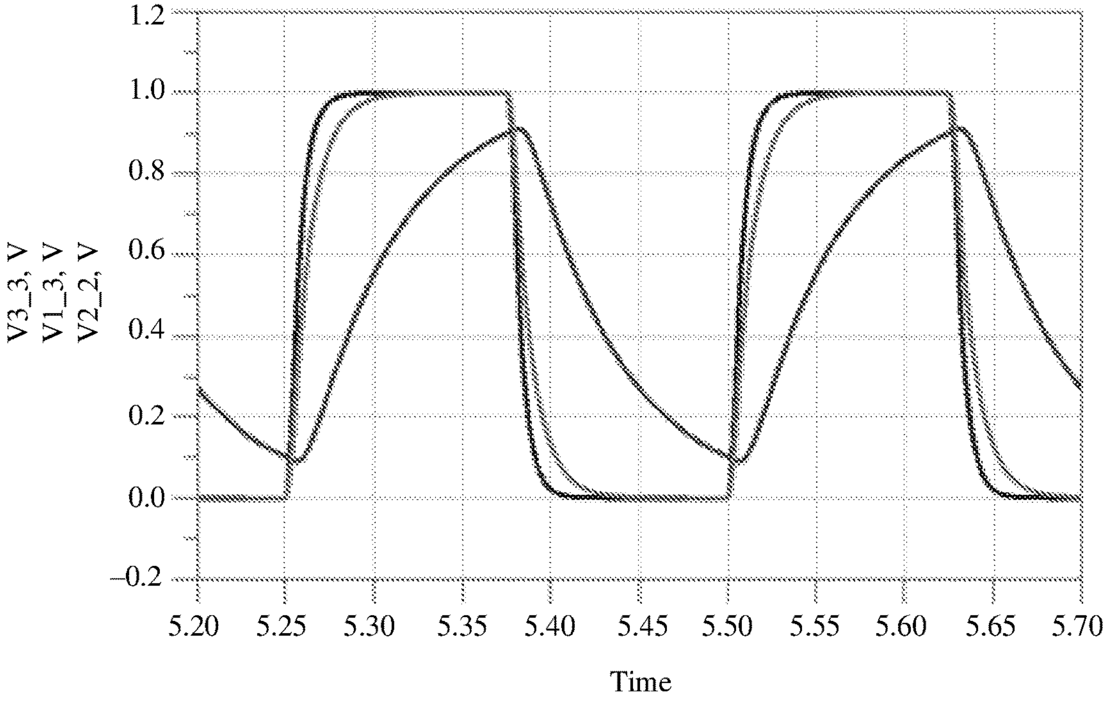
FIG. 11 is a line graph of a clock signal and a transmission rate of image data of a pixel drive circuit in one pixel area shown in FIG. 7.

Refer to FIG. 10 and FIG. 11. FIG. 10 is an equivalent circuit diagram of transmitting image data to a pixel drive circuit in one pixel area shown in FIG. 7, and FIG. 11 is a line graph of transmission rates of a clock signal and image data of a pixel drive circuit in one pixel area shown in FIG. 7.

As shown in FIG. 10, when image data Data is transmitted in any pixel area, the image data Data passes through a cabling resistor R_m, a cabling capacitor Cm, and a ground resistor R-gnd-m on a display substrate (a backplane circuit board), then passes through Q data cabling resistors R_sig and Q input/output buffer interfaces I/O buffer, and is transferred. The Q input/output buffer interfaces I/O buffer are input/output interfaces of the Q levels of cascaded pixel drive circuits PD. An input/output buffer interface I/O buffer of each level of pixel drive circuits PD is further connected to a ground terminal by using a connection end capacitor Cpad and a ground resistor R-gnd of the pixel drive circuit PD.

Further, Table 1 is a power consumption list of the clock signal and the image data shown in FIG. 7 and FIG. 10.

TABLE 1

Manner of calculating power consumption of image data and a clock signal

| Description | Parameter | Unit | Remark |
|---|---|---|---|
| Backplane cabling capacitor | $C_m$ | pF | |
| PD Pad capacitor | $C_{pad}$ | pF | |
| Signal voltage amplitude | $V_{sig}$ | V | |
| Display frame rate | $F_{vsync}$ | Hz | |
| Quantity of bits for an RGB subpixel | $N_{RGB}$ | bit | A quantity of bits required for one pixel is: $3 \times N_{RGB}$ |
| Global clock in PWM | GCLK | Hz | For example, $2^{N_{RGB}} \times F_{vsync}$ |
| Quantity of pixels driven by each PD | k | | |
| Quantity of rows of PDs | $n = N \times Q$ | | |
| Quantity of columns of PDs | $m = M \times P$ | | |
| Quantity of rows of pixel areas | N | | |

TABLE 1-continued

| Manner of calculating power consumption of image data and a clock signal | | | |
|---|---|---|---|
| Description | Parameter | Unit | Remark |
| Quantity of columns of the pixel areas | M | | |
| Quantity of rows of PDs in a pixel area | Q | | |
| Quantity of columns of PDs in the pixel area | P | | |
| Quantity of bits transmitted in one frame of an image | $3 \times N_{RGB} \times k \times n$ | bit | Bits transmitted by using one signal line, that is, a quantity of bits in one frame |
| Load capacitance of a data link | $C_m + C_{pad}$ | pF | |
| Load capacitance driven by a PD | $C_{pad}$ | pF | |
| Load capacitance of a clock signal | $C_m + P \times C_{pad}$ | pF | |
| GCLK power consumption ($P_{GCLK}$) | $(C_m + P \times Q \times C_{pad}) \times V_{sig}^2 \times M \times N \times f_{GCLK}/1e9$ | mW | Power consumption of a global clock (control PWM) line |
| SCLK power consumption ($P_{sclk}$) | $\left[C_m + \left(1 + (Q-1) \times \frac{Q-2}{2}\right) \times P \times C_{pad}\right] \times V_{sig}^2 \times 3 \times N_{RGB} \times k \times M \times N \times F_{vsync} \times 2/1e9$ | mW | Power consumption of Data on a clock line |
| Power consumption ($P_{data\_m}$) of Data on a main line | $(C_m + N \times C_{pad}) \times V_{sig}^2 \times 3 \times N_{RGB} \times k \times n \times m \times F_{vsync}/1e9$ | mW | Power consumption of Data on a main line |
| Power consumption $P_{data\_L}$ of Data during cascading | $C_{pad} \times V_{sig}^2 \times (Q-1) \times (Q-2)/2 \times P \times M \times N \times 3 \times N_{RGB} \times k \times F_{vsync}/1e9$ | mW | Power consumption of a cascaded Data line |
| Total power consumption | $P_{GCLK} + P_{sclk} + P_{data\_m} + P_{data\_L}$ | mW | Total signal transmission power consumption |

As shown in FIG. 11, symbols in FIG. 11 are represented and described as follows: V3_1 represents a waveform of a data cascading link shown in FIG. 7; V1_3 represents a waveform of a main data link shown in FIG. 7; and V2_2 is a signal waveform of data transmission when each pixel drive circuit is directly connected to a display driver circuit. As shown in FIG. 11, in this embodiment of this application, a data transmission rate during data cascading and clock signal transmission during clock cascading are significantly increased.

More specifically, when N×Q is 320 and M×P is 320, that is, when the display area AA includes 320×320 pixel drive circuits PD connected in a matrix, a calculation result of power consumption of data transmission and clock signal transmission in the pixel drive circuit shown in FIG. 7 is determined according to the foregoing technical manner, as shown in Table 2 and Table 3. Table 2 is a parameter definition of the pixel drive circuit included in the display area AA, and Table 3 is power consumption of data transmission and clock signal transmission in the pixel drive circuit.

TABLE 2

| Power consumption of data transmission and clock signal transmission in a pixel drive circuit | | |
|---|---|---|
| Parameter | Value | Unit |
| Link capacitance $C_m$ | 5 | pF |
| Pad capacitance $C_{pad}$ | 0.1 | pF |
| Signal amplitude $V_{sig}$ | 1 | V |
| Quantity of bits for a subpixel | 12 | bit |
| Quantity of pixels controlled by a PD | 5 | pixel |
| Quantity m of PDs in an X direction | 320 | None |
| Quantity n of PDs in a Y direction | 320 | None |
| Quantity N of rows of pixel areas | 16 | None |
| Quantity M of columns of pixel areas | 8 | None |
| Quantity P of rows of PDs/Block | 20 | None |
| Quantity Q of columns of PDs/Block | 40 | None |
| Frame rate $F_{vsync}$ | 60 | Hz |
| GCLK frequency | 245760 | Hz |

TABLE 3

Power consumption of data transmission and clock signal transmission in a pixel drive circuit

| GCLK | | SCLK | | Data | |
|---|---|---|---|---|---|
| Load capacitance of a main link | 9 pF | Load capacitance of a main link | 9 pF | Load capacitance of a main link | 6.6 pF |
| Cascading load capacitance | 0.1 pF | Cascading load capacitance | 0.1 pF | Cascading load capacitance | 0.1 pF |
| Power consumption of a GCLK on a main link | 0.283 mW | Power consumption of an SCLK on the main link | 0.498 mW | Power consumption of Data on the main link | 7.299 mW |
| Power consumption of a cascading GCLK | 2.391 mW | Power consumption of a cascading SCLK | 1.891 mW | Power consumption of cascading Data | 0.946 mW |
| Power consumption of a GCLK | 2.674 mW | Power consumption of an SCLK | 2.389 mW | Power consumption of an SCLK | 8.245 mW |
| Total power consumption | 13.307 mW | | | | |

It can be seen that in this embodiment, during signal transmission of an enormous quantity of μ-LEDs and pixel drive circuits PD, pixels and pixel drive circuits are partitioned and cascaded in a block, so that signal integrity of a clock and data on a data line during data transmission can be effectively ensured, data transmission power consumption can be greatly reduced, and overall power consumption of a display panel and a semiconductor display apparatus can be reduced.

The foregoing descriptions are embodiments of this application. It should be noted that a person of ordinary skill in the art may make several improvements or polishing without departing from the principle of this application, and the improvements or polishing shall also fall within the protection scope of this application.

What is claimed is:

1. A display panel, comprising a plurality of pixel areas that are arranged as a first matrix of N rows and M columns, wherein each pixel area of the plurality of pixel areas comprises a plurality of pixel drive circuits that are arranged in the pixel area as a second matrix of Q rows and P columns, each pixel drive circuit of the plurality of pixel drive circuits is connected to at least one pixel unit, the each pixel drive circuit is configured to drive, based on to-be-displayed image data, the connected at least one pixel unit to emit light to display an image, and N, M, Q, and P are natural numbers greater than 1;

all pixel areas in any one column in the first matrix are connected to data interfaces in a same group, and pixel areas, in the first matrix, in different columns are connected to data interfaces in different groups; and in any one of the pixel areas in the first matrix, pixel drive circuits in any column of pixel drive circuits of the second matrix are sequentially cascaded, by connecting, at each level i from a first level to $(Q-1)^{th}$ level, an output from a pixel driving circuit in the any one of the pixel areas at the each level to an input of a pixel driving circuit in the any one of the pixel areas at the (i+1)st level, to form Q levels of cascaded pixel drive circuits, a first-level pixel drive circuit in said any column of pixel drive circuits is connected to one data interface to receive the image data and a clock signal, and the image data and the clock signal are transmitted to a $Q^{th}$-level pixel drive circuit in said any column of pixel drive circuits in a cascading sequence.

2. The display panel according to claim 1, wherein display driver modules of at least two different pixel areas in the first matrix are connected to different clock interfaces, each clock interface of the different clock interfaces comprises a data clock interface for providing a data clock signal, and the data clock signal is used to control a time sequence of loading the image data to the plurality of pixel drive circuits in any column of pixel drive circuits in the second matrix; and the first-level pixel drive circuit is connected to one data clock interface to receive the data clock signal, and the data clock signal is transmitted to the $Q^{th}$-level pixel drive circuit in the cascading sequence.

3. The display panel according to claim 2, wherein the data clock signal comprises Q consecutive pulse signals, one-bit image data is loaded to a one-level pixel drive circuit for each pulse signal, and the image data is separately loaded to the Q levels of the pixel drive circuits based on the Q consecutive pulse signals.

4. The display panel according to claim 2, wherein the clock interface further comprises a global clock interface, and a global clock signal received on the global clock interface is used to control light emitting duration of each pixel unit in a time length of one frame of the image; and the first-level pixel drive circuit is connected to the global clock interface to receive the global clock signal, and the global clock signal is transmitted to the $Q^{th}$-level pixel drive circuit in the cascading sequence.

5. The display panel according to claim 4, wherein the display panel comprises a display area and a non-display area, and the pixel areas arranged as the first matrix are disposed in the display area; and the display panel further comprises a display driver circuit disposed in the non-display area, wherein the display driver circuit is connected to pixel drive circuits in the plurality of pixel areas, and is configured to output the image data, the data clock signal, and the global clock signal to the pixel drive circuit.

6. The display panel according to claim 2, wherein different display driver modules of each pixel area of the first matrix are connected to different clock interfaces, and the display driver circuit comprises P×M data interfaces, M×N data clock interfaces, and M×N global clock interfaces.

7. The display panel according to claim 1, wherein each pixel unit of the at least one pixel unit comprises three light emitting elements, each light emitting element emits light of different colors and is a micro light emitting diode, an anode of the micro light emitting diode is connected to a drive power supply, a cathode of the micro light emitting diode is connected to the pixel drive circuit connected to the at least one pixel unit, and the drive power supply is configured to provide a drive current for the each light emitting element; and the pixel drive circuit controls, based on the image data, a time length for providing the drive current to each of the three light emitting elements, wherein light emitting luminance of each of the three light emitting elements is positively correlated with the time length.

8. The display panel according to claim 7, wherein each pixel drive circuit is connected to four pixel units of the at least one pixel units, the each pixel drive circuit comprises one input interface and four groups of output interfaces, the one input interface is connected to the one data interface, and one group of the output interfaces is connected to cathodes of the three light emitting elements in one pixel unit.

9. The display panel according to claim 8, wherein the each pixel drive circuit is a micro integrated circuit.

10. A semiconductor display apparatus, wherein the semiconductor display apparatus comprises the display panel, wherein the display panel, comprising a plurality of pixel areas that are arranged as a first matrix of N rows and M columns, wherein each pixel area of the plurality of pixel areas comprises a plurality of pixel drive circuits that are arranged in the pixel area as a second matrix of Q rows and P columns, each pixel drive circuit of the plurality of pixel drive circuits is connected to at least one pixel unit, the each pixel drive circuit is configured to drive, based on to-be-displayed image data, the connected at least one pixel unit to emit light to display an image, and N, M, Q, and P are natural numbers greater than 1;

all pixel areas in any one column in the first matrix are connected to data interfaces in a same group, and pixel areas, in the first matrix in different columns are connected to data interfaces in different groups; and in any one of the pixel areas in the first matrix, pixel drive circuits in any column of pixel drive circuits of the second matrix are sequentially cascaded, by connecting, at each level i from a first level to $(Q-1)^{th}$ level, an output from a pixel driving circuit in the any one of the pixel areas at the each level to an input of a pixel driving circuit in the any one of the pixel areas at the (i+1) st level, to form Q levels of cascaded pixel drive circuits, a first-level pixel drive circuit in said any column of pixel drive circuits is connected to one data interface to receive the image data and a clock signal, and the image data and the clock signal are transmitted to a $Q^{th}$-level pixel drive circuit in said any column of pixel drive circuits in a cascading sequence.

11. The semiconductor display apparatus according to claim 10, wherein display driver modules of at least two different pixel areas in the first matrix are connected to different clock interfaces, each clock interface of the different clock interfaces comprises a data clock interface for providing a data clock signal, and the data clock signal is used to control a time sequence of loading the image data to the plurality of pixel drive circuits in any column of pixel drive circuits in the second matrix; and the first-level pixel drive circuit is connected to one data clock interface to receive the data clock signal, and the data clock signal is transmitted to the $Q^{th}$-level pixel drive circuit in the cascading sequence.

12. The semiconductor display apparatus according to claim 11, wherein the data clock signal comprises Q consecutive pulse signals, one-bit image data is loaded to a one-level pixel drive circuit for each pulse signal, and the image data is separately loaded to the Q levels of the pixel drive circuits based on the Q consecutive pulse signals.

13. The semiconductor display apparatus according to claim 11, wherein the clock interface further comprises a global clock interface, and a global clock signal received on the global clock interface is used to control light emitting duration of each pixel unit in a time length of one frame of the image; and the first-level pixel drive circuit is connected to the global clock interface to receive the global clock signal, and the global clock signal is transmitted to the $Q^{th}$-level pixel drive circuit in the cascading sequence.

14. The semiconductor display apparatus according to claim 13, wherein the display panel comprises a display area and a non-display area, and the pixel areas arranged as the first matrix are disposed in the display area; and the display panel further comprises a display driver circuit disposed in the non-display area, wherein the display driver circuit is connected to pixel drive circuits in the plurality of pixel areas, and is configured to output the image data, the data clock signal, and the global clock signal to the pixel drive circuit.

15. The semiconductor display apparatus according to claim 11, wherein different display driver modules of each pixel area of the first matrix are connected to different clock interfaces, and the display driver circuit comprises P×M data interfaces, M×N data clock interfaces, and M×N global clock interfaces.

16. The semiconductor display apparatus according to claim 10, wherein each pixel unit of the at least one pixel unit comprises three light emitting elements, each light emitting element emits light of different colors and is a micro light emitting diode, an anode of the micro light emitting diode is connected to a drive power supply, a cathode of the micro light emitting diode is connected to the pixel drive circuit connected to the at least one pixel unit, and the drive power supply is configured to provide a drive current for the each light emitting element; and the pixel drive circuit controls, based on the image data, a time length for providing the drive current to each of the three light emitting elements, wherein light emitting luminance of each of the three light emitting elements is positively correlated with the time length.

17. The semiconductor display apparatus according to claim 16, wherein each pixel drive circuit is connected to four pixel units of the at least one pixel units, the each pixel drive circuit comprises one input interface and four groups of output interfaces, the one input interface is connected to the one data interface, and one group of the output interfaces is connected to cathodes of the three light emitting elements in one pixel unit.

18. The semiconductor display apparatus panel according to claim 17, wherein the each pixel drive circuit is a micro integrated circuit.

* * * * *